US008489247B1

(12) United States Patent
Engler

(10) Patent No.: US 8,489,247 B1
(45) Date of Patent: Jul. 16, 2013

(54) AGENT-BASED CHAOTIC CONTROL OF WIND TURBINES

(75) Inventor: Joseph J. Engler, Coggon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 307 days.

(21) Appl. No.: 13/051,717

(22) Filed: Mar. 18, 2011

(51) Int. Cl.
G05D 3/00 (2006.01)
G05D 17/00 (2006.01)
F01D 17/24 (2006.01)
G06Q 50/06 (2012.01)

(52) U.S. Cl.
CPC ......... F01D 17/24 (2013.01); Y02E 10/723 (2013.01); G06Q 50/06 (2013.01)
USPC .................... 700/291; 700/287; 700/290

(58) Field of Classification Search
USPC ............ 700/290, 287, 291; 702/60–63
See application file for complete search history.

(56) References Cited

U.S. PATENT DOCUMENTS

| | | | |
|---|---|---|---|
| 6,909,198 B2 * | 6/2005 | Ragwitz et al. | 290/44 |
| 6,975,925 B1 * | 12/2005 | Barnes et al. | 700/286 |
| 7,403,854 B1 * | 7/2008 | Hurley et al. | 700/291 |
| 7,822,582 B2 * | 10/2010 | Mertins et al. | 700/291 |
| 7,942,634 B2 * | 5/2011 | Christensen | 416/1 |
| 8,050,899 B2 * | 11/2011 | Giguere et al. | 700/286 |
| 8,060,340 B2 * | 11/2011 | Gao et al. | 702/182 |
| 8,150,641 B2 * | 4/2012 | Morjaria et al. | 702/60 |
| 8,185,331 B2 * | 5/2012 | Parikh et al. | 702/60 |
| 8,200,435 B2 * | 6/2012 | Stiesdal | 700/291 |
| 8,202,048 B2 * | 6/2012 | Stiesdal et al. | 416/1 |
| 8,265,798 B2 * | 9/2012 | Imes | 700/291 |
| 8,272,265 B2 * | 9/2012 | Bucher et al. | 73/457 |
| 8,290,634 B2 * | 10/2012 | Larsen et al. | 700/287 |
| 8,332,077 B2 * | 12/2012 | Kondo et al. | 700/287 |
| 2002/0029097 A1 * | 3/2002 | Pionzio et al. | 700/286 |
| 2003/0160457 A1 * | 8/2003 | Ragwitz et al. | 290/44 |
| 2004/0009063 A1 * | 1/2004 | Polacsek | 416/1 |
| 2007/0124025 A1 * | 5/2007 | Schram et al. | 700/287 |
| 2008/0195255 A1 * | 8/2008 | Lutze et al. | 700/291 |
| 2009/0060740 A1 * | 3/2009 | Stiesdal et al. | 416/41 |
| 2009/0143871 A1 * | 6/2009 | Gao et al. | 700/29 |

(Continued)

OTHER PUBLICATIONS

Giebel, G., "The State-Of-The-Art in Short-Term Prediction of Wind Power, A Literature Overview, Version 1.1", Aug. 2003, Project ANEMOS Contract No. ENK5-CT-2002-00665.*

(Continued)

Primary Examiner — Mohammad Ali
Assistant Examiner — Kelvin Booker
(74) Attorney, Agent, or Firm — Donna P. Suchy; Daniel M. Barbieri

(57) ABSTRACT

A method of controlling at least one wind turbine is provided. The method comprises predicting at least one future state related to the at least one wind turbine. The method further comprises evaluating a fitness of solutions associated with a plurality of individuals of a population for a current operating environment of the at least one wind turbine. Each individual comprising a dominant genotype and a recessive genotype. Each genotype represents a solution for controlling the at least one wind turbine. A fitness function is applied to the dominant genotype of each individual. The fitness function is based on the at least one predicted future state. The method further comprises storing previously encountered genotypes in the recessive genotypes of the individuals. The method further comprises selecting a solution for controlling operation of the at least one wind turbine based on the fitness evaluation.

18 Claims, 8 Drawing Sheets

U.S. PATENT DOCUMENTS

| | | | | |
|---|---|---|---|---|
| 2009/0299780 | A1* | 12/2009 | Sarkar et al. | 702/61 |
| 2010/0094474 | A1* | 4/2010 | Larsen et al. | 700/287 |
| 2010/0117361 | A1* | 5/2010 | Christensen | 290/44 |
| 2010/0148712 | A1* | 6/2010 | Klatt | 318/400.42 |
| 2010/0204844 | A1* | 8/2010 | Rettger et al. | 700/291 |
| 2010/0263167 | A1* | 10/2010 | Fox | 16/400 |
| 2010/0280673 | A1* | 11/2010 | Woste | 700/287 |
| 2011/0004356 | A1* | 1/2011 | Garcia | 700/287 |
| 2011/0106324 | A1* | 5/2011 | Tsadka et al. | 700/287 |
| 2011/0149268 | A1* | 6/2011 | Marchant et al. | 356/27 |
| 2011/0202191 | A1* | 8/2011 | Larsson et al. | 700/287 |
| 2011/0224926 | A1* | 9/2011 | Morjaria et al. | 702/60 |
| 2011/0226892 | A1* | 9/2011 | Crowther et al. | 244/17.23 |
| 2011/0245990 | A1* | 10/2011 | Rasmussen | 700/298 |
| 2011/0307109 | A1* | 12/2011 | Sri-Jayantha | 700/291 |
| 2012/0049516 | A1* | 3/2012 | Viassolo | 290/44 |
| 2012/0059638 | A1* | 3/2012 | Garate lvaro | 703/9 |
| 2013/0035798 | A1* | 2/2013 | Zhou et al. | 700/287 |
| 2013/0046492 | A1* | 2/2013 | Westergaard | 702/60 |

OTHER PUBLICATIONS

Kusiak, A.; Song, Z.; Zheng, H., "Anticipatory Control of Wind Turbines With Data-Driven Predictive Models", Sep. 2009, IEEE Transactions on Energy Conversion, vol. 24, No. 3.*

Kusiak, A. and Zhang, Z., "Short-Horizon Prediction of Wind Power: A Data-Driven Approach", Dec. 2010, IEEE Transactions on Energy Conversion, vol. 25, No. 4.*

Kusiak, A.; Zheng, H. and Song, Z., "Short-Term Prediction of Wind Farm Power: A Data Mining Approach", Mar. 2009, IEEE Transactions on Energy Conversion, vol. 24, No. 1.*

Kusiak, A. and Verma, A., "Prediction of Status Patterns of Wind Turbines: A Data-Mining Approach", Feb. 2011, Journal of Solar Energy Engineering, vol. 133.*

Zheng, H. And Kusiak, A., "Prediction of Wind Farm Power Ramp Rates: A Data-Mining Approach", 2009, Journal of Solar Energy Engineering, vol. 131.*

Kusiak, A. and Zhang, Z., "Analysis of Wind Turbine Vibrations Based on SCADA Data", 2009, Journal of Solar Energy Engineering, vol. 131.*

Saad-Saoud, Z. and Jenkins, N., "Models for Predicting Flicker Induced by Large Wind Turbines", Sep. 1999, IEEE Transactions on Energy Conversion, vol. 14, No. 3.*

Sedighizadeh, M.; Rezazadeh, A. and Khatibi, M., "A Self-Tuning PID Control for a Wind Energy Conversion System Based on the Lyapunov Approach", Sep. 2008, Universities Power Engineering Conference, UPEC 2008.*

Tian-Hua, C.; Pei-Yuan, G.; Zai-Wen, L. and Kun-Peng, W., "Study on the Turntable Hydraulic Variable Structure Control Based on Lyapunov Theory", Apr. 2009, 2009 International Conference on Measuring Technology and Mechatronics Automation.*

Yanning, Z.; Longyun, K.; Shigiong, Z. and Binggang, C., "Wind Speed Predicted by Wavelet Anlysis in Input Prediction Control of Wind Turbine", Jun. 2008, Proceedings of the 7th World Congress on Intelligent control and Automation.*

* cited by examiner

AGENT-BASED CHAOTIC CONTROL OF WIND TURBINES

CROSS-REFERENCE TO RELATED APPLICATIONS

The present disclosure is related to U.S. patent application Ser. No. 13/051,835, titled "Explicit Diploid Evolutionary Control", U.S. patent application Ser. No. 13/051,849, titled "Random Emigrant Strategy for Explicit Diploid Evolutionary Control", U.S. patent application Ser. No. 13/051,672, titled "Prediction Method", U.S. patent application Ser. No. 13/051,751, titled "Diploid Control of Water Heaters", and U.S. patent application Ser. No. 13/051,787, titled "Wind Prediction for Wind Farms Through the Use of Weather Radar", all of which were filed concurrently with the present application and all of which are incorporated herein by reference.

BACKGROUND

The present disclosure relates generally to the field of system prediction and control. More particularly, the present disclosure relates to prediction and control of systems such as wind turbines and/or wind farms.

Wind power has emerged as a primary source of renewable energy. However, the wind power industry faces challenges in the area of turbine reliability. Some of these challenges are related to the high structural loads in the drive train of the wind turbines and the difficulty in predicting the electrical power output. The structural loads and related failure states may contribute to equipment manufacturers offering short warranties (e.g., two-year warranties) after which wind developers and power companies may expend significant resources to keep the turbines operational. Further, the difficulty in predicting wind turbine power (i.e., electrical power) output due to the variability of wind as an energy source may cause power companies to maintain reserve sources of electrical power (e.g., spinning but not providing power to the electrical grid). At present, penetration of wind power into the electrical grid is about two percent. As penetration of wind power increases in the coming years (e.g., to a level expected to be about 20-25 percent), the stability of the electrical grid may become increasingly dependent upon accurate prediction and reliability of wind energy as an input source.

SUMMARY

One embodiment of the disclosure relates to a method of controlling at least one wind turbine. The method comprises predicting at least one future state related to the at least one wind turbine. The method further comprises evaluating a fitness of solutions associated with a plurality of individuals of a population for a current operating environment of the at least one wind turbine. Each individual comprising a dominant genotype and a recessive genotype. Each genotype represents a solution for controlling the at least one wind turbine. A fitness function is applied to the dominant genotype of each individual. The fitness function is based on the at least one predicted future state. The method further comprises storing previously encountered genotypes in the recessive genotypes of the individuals. The method further comprises selecting a solution for controlling operation of the at least one wind turbine based on the fitness evaluation.

Another embodiment of the disclosure relates to a control system comprising an electronic processor. The processor is configured to embed time series data relating to at least one wind turbine within a reconstructed phase space. The processor is further configured to predict at least one future state related to the at least one wind turbine based on a rate of separation of trajectories of the embedded data within the reconstructed phase space. The processor is further configured to control operation of the at least one wind turbine based on the predicted at least one future state.

Another embodiment of the disclosure relates to a non-transitory computer-readable medium having instructions stored thereon. The instructions are executable by a processor to execute a method comprising embedding data related to operation of at least one wind turbine in a reconstructed phase space. The method further comprises predicting at least one future state of the at least one wind turbine based on a rate of separation of trajectories of the embedded data within the reconstructed phase space. The method further comprises generating a population comprising a plurality of individuals. Each individual comprising a dominant genotype and a recessive genotype. Each genotype represents a solution for controlling the at least one wind turbine. The method further comprises evaluating a fitness of the solutions associated with the plurality of individuals for a current operating environment of the at least one wind turbine by applying a fitness function to the dominant genotype of each individual. The fitness function is based on the at least one predicted future state. The method further comprises storing previously encountered genotypes in the recessive genotypes of the individuals. The method further comprises selecting a solution for controlling operation of the at least one wind turbine based on the fitness evaluation.

DETAILED DESCRIPTION

Figure 1A:
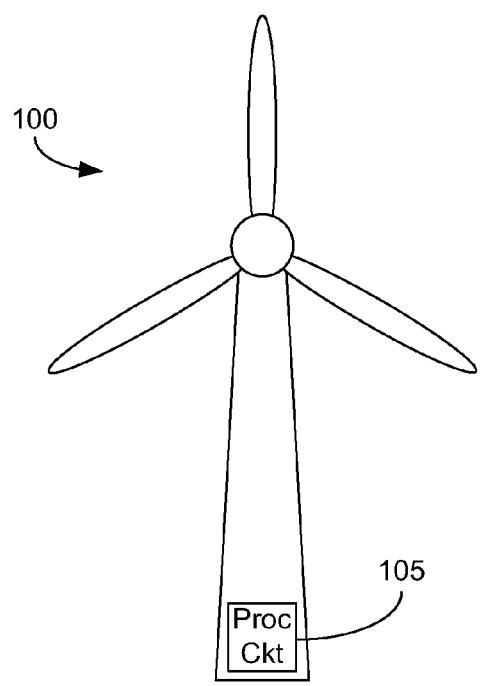
FIG. 1A is an illustration of a wind turbine according to an exemplary embodiment.

Referring generally to the figures, systems and methods for controlling one or more wind turbines (e.g., a single wind turbine, a wind farm, a system of several wind farms, etc.) are provided according to various exemplary embodiments. Wind turbines and/or wind farms have been found to exhibit nonlinearly deterministic behavior (e.g., chaotic behavior). Systems generally tend toward one of several eventual states, such as steady state (e.g., to a fixed point), periodic, random, or chaotic. Chaotic states are represented by a metric space that is finitely bounded while exhibiting an infinite or nearly infinite number or trajectories or orbits within the bound space. These trajectories do not revisit a point previously visited within the bounds of the metric space; if they did, the trajectories would be periodic as the equations of motion for the chaotic states are deterministic.

Prior methodologies for deterministic prediction of chaotic systems fail to take into account the exponential divergence/convergence of the system. For example, methods such as a nearest neighbor prediction and ellipsoid prediction make use of neighboring orbits of a system but do not consider that these orbits may diverge or converge at an exponential rate.

Exemplary systems and methods disclosed herein predict future states of a system based on the rate of separation of trajectories within an embedded phase space to accurately predict the future states. For example, some exemplary embodiments may be used to predict future states of a wind turbine or a group of wind turbines (e.g., a wind farm). In the context of wind turbine-related embodiments, the future states may relate to a predicted velocity of wind in the area of the wind turbines, predicted load on the wind turbines, predicted electrical power output of the wind turbines, and/or any other type of data relating to the wind turbines.

Predicting the future states of a system may include embedding time series data relating to the system within a reconstructed phase space. Time series data includes a series or sequence of data points, each of which is measured at and/or associated with a particular point in time. In some embodiments, time series data may be measured at regular periodic time intervals (e.g., 10 milliseconds, one second, 30 seconds, one minute, 15 minutes, one hour, one day, etc.). In the context of wind turbine-related embodiments, the time series data may represent wind speed or velocity, the load applied to the wind turbines, the electrical power output of the wind turbines, and/or other wind turbine-related data measured at a series of different times. For example, in one embodiment, the time series data may include wind velocity data for wind in the area of a wind turbine measured at 30 second intervals for a period of five minutes. The time series data can be used to reconstruct a phase space representation of various states of the system, and futures states of the system may be predicted based on the separation of trajectories of the embedded time series data within the reconstructed phase space. For example, the electrical power output of a wind turbine or wind farm at a particular time or range of times may be predicted based on time series data relating to wind velocity or electrical power output of the wind turbine(s) that is embedded in the reconstructed phase space.

Various exemplary embodiments utilize the predicted future states to determine best solutions for controlling the wind turbines using diploid evolutionary control. Genetic algorithms may be used to analyze a system operating environment and determine solutions that are most fit to allow the system to achieve certain goals. Genetic algorithms may evaluate a group of individuals in a population against a fitness function to determine which individuals are most fit to achieve the goals. Each of the individuals includes at least one genotype that represents a solution for controlling the system.

For analysis related to the control of wind turbines, the environment being analyzed may include any factors that may affect the operation of the wind turbines, such as current and/or historical data regarding speed of the wind in the area of the wind turbines, the structural load applied to the wind turbines to generate electrical power, the power output of the wind turbines, and/or other factors. A population of individuals may be generated such that each individual represents one or more solutions for controlling the wind turbines over a particular timeframe. For example, each individual may include a genotype (e.g., a data structure configured to store a value or set of values) configured to store a solution for controlling the wind turbines (e.g., integers, real numbers, bit strings, etc. representing set points that define how a controller of the wind turbines controls the structural load applied to the wind turbines to generate electrical power). For example, a first group of set points stored in a genotype of one individual may cause the controller to apply a higher structural load and generate more power during daytime hours than in the evening. A second group of set points stored in a genotype of another individual may cause the controller to apply a lower structural load and generate less power during daytime hours than in the evening. The population of individuals may represent and/or contain all solutions that are to be examined in light of the fitness function.

The fitness function may be designed and/or customized for particular applications and/or to meet particular goals. For example, the fitness function may be configured to favor solutions that generate more electrical power at times when it is anticipated that the demand will be higher. The system may be configured to receive historical power demand data for different days and/or times to determine when the demand for electrical power from the wind turbines is higher or lower. In some instances, the data may indicate that there is a higher demand for electrical power from the wind turbines during the evening than during the day (e.g., because many consumers who receive power from the wind turbines are not home during the daytime). In such instances, the fitness function may determine the individual having the second group of set points stored in its genotype (i.e., the set points that cause more power to be generated in the evening) to be more fit than the individual having the first group of set points stored in its genotype. In some instances, the data may indicate that there is a higher demand for electrical power during the daytime than in the evening (e.g., because businesses demand more electrical power during the daytime, because consumers are operating air conditioning units frequently during the daytime, etc.). In such instances, the fitness function may determine the individual having the first group of set points stored in its genotype (i.e., the set points that cause more power to be generated in the daytime) to be more fit than the individual having the second group of set points stored in its genotype.

In some embodiments, a haploid genetic algorithm may be used to control a system. Haploid genetic algorithms, or genetic algorithms using a single genotype to represent each individual in the population of the algorithm, may react ineffectively to changes in environmental conditions.

Various exemplary embodiments disclosed herein utilize a diploid, vice haploid representation for individuals within the population of the algorithm where each individual is represented using a dominant genotype and a recessive genotype. Such embodiments may add explicit memory to biologically inspired algorithms with real-time change detection to speed optimization and modeling convergence. Diploid individuals are configured to store two separate solutions for the system, one in a dominant genotype and one in a recessive genotype. The solutions stored in the dominant genotypes may represent a main group of solutions to be evaluated for fitness in addressing the goals represented within the fitness function. The recessive genotype of each individual is used to maintain a memory or history of previous best individuals based on fitness evaluations for rapid environmental change detection and adjustment. For example, in the context of wind turbine-related embodiments, each individual in the population may include a dominant genotype configured to store a first group of set points that may be used to control the wind turbines in a first manner and a recessive genotype configured to store a second group of set points that may be used to control the wind turbines in a second manner. The second group of set points may be a group of set points that was previously evaluated using the fitness function and determined to be an appropriate, or fit, solution for a set of previously encountered environmental conditions (e.g., wind speed, structural load, energy demand, time and/or day, etc.). A fitness function may be used to evaluate the fitness of individuals in the population for selection of parents for recombination and mutation and to arrive rapidly at a new optimization schema. Exemplary embodiments disclosed herein may provide memory of good solutions for previously encountered process environments, rapid convergence of control algorithms to changes in environments, and/or maintenance of diversity within the population of the algorithms.

Figure 1B:
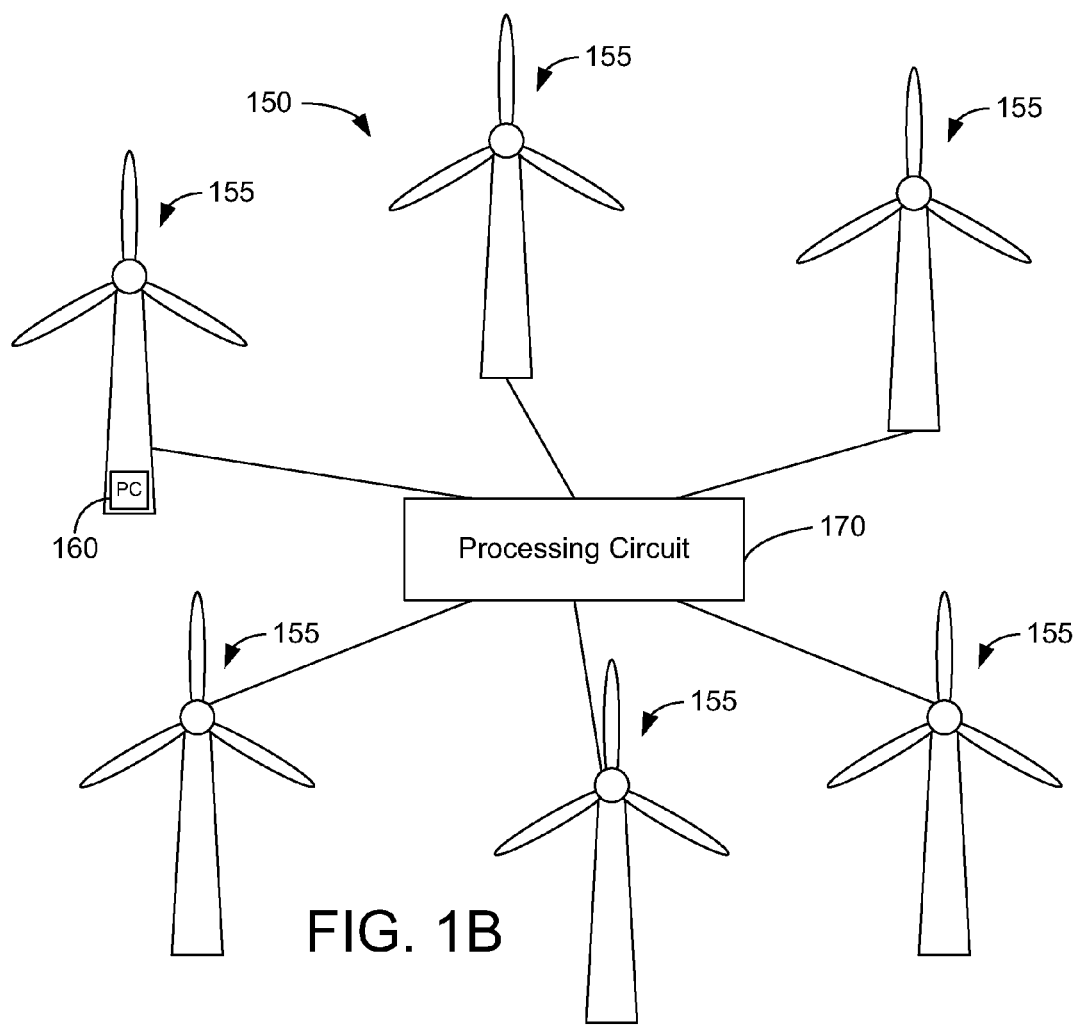
FIG. 1B is an illustration of a wind farm including a plurality of wind turbines according to an exemplary embodiment.
Figure 1C:
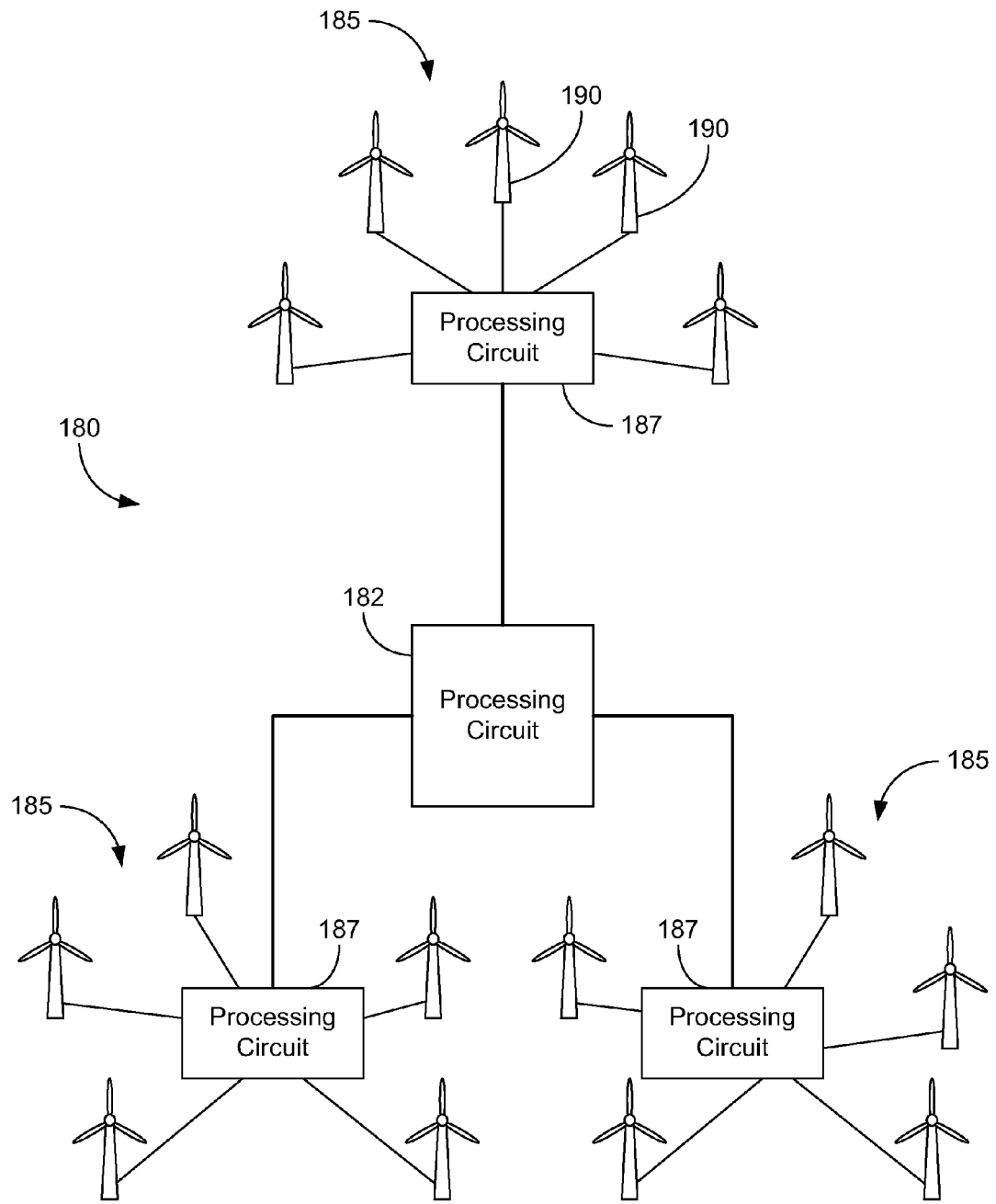
FIG. 1C is an illustration of a system of wind farms according to an exemplary embodiment.

Referring now to FIGS. 1A through 1C, environments in which exemplary systems and methods disclosed herein may be implemented are shown according to exemplary embodiments. FIG. 1A illustrates a single wind turbine 100 having a processing circuit 105 configured to control operation of the wind turbine. Processing circuit 105 may be configured to utilize one or more adjustable set points to determine the structural load that should be applied in wind turbine 100 to generate electrical energy. The set points may be used in conjunction with a power prediction schema that predicts the power to be generated by wind turbine 100 over a particular time period (e.g., a 24 hour period). In some embodiments, if wind is available during a time in which wind turbine 100 was not predicted to run, processing circuit 105 may disable wind turbine 100 from operating to ensure power grid stability.

FIG. 1B illustrates a wind farm 150 including a plurality of wind turbines 155. Each individual wind turbine may be controlled by a dedicated processing circuit 160 and/or two or more wind turbines may be controlled by a central processing circuit 170. Central processing circuit 170 may be configured to account for the impact individual turbines may have on other turbines in wind farm 150. For example, one turbine 155 may generate a wake that affects the operation of other neighboring turbines 155 in wind farm 150. Central processing circuit 170 may be configured to operate the wind turbines in wind farm 150 in a manner that reduces the effect that the wakes from the turbines have on other neighboring turbines to reduce the structural loads on the neighboring turbines.

FIG. 1C illustrates a system 180 including several wind farms 185, each having one or more wind turbines 190. The wind turbines may be controlled by dedicated processing circuits. The wind turbines may additionally or alternatively be controlled using one or more central processing circuits 187 for each wind farm. The wind turbines may additionally or alternatively be controlled using a system processing circuit 182 configured to centrally control multiple wind farms. Wind farms and wind turbines are examples of systems that may display chaotic behavior.

Some exemplary embodiments may achieve an accuracy of 0.02 percent or less error (e.g., over 100 ten-minute intervals for wind turbine generator speed and wind turbine fault prediction) up to 16 hours in the future. In various other exemplary embodiments, systems and methods disclosed herein may be used to control and/or predict future states of various other types of systems in fields such as medicine (e.g., complex organs such as the heart and brain), trading market forecasting, civil and military cyber security, environmental systems, human behavior, and/or other types of systems.

In some embodiments, one or more wind turbines may be controlled using a diploid evolutionary method. Possible solutions for controlling wind turbines (e.g., representing a set of set points for configuring the wind turbine structural load and/or power output) may be evaluated using a fitness function based on environmental conditions (e.g., wind speed, structural load state, power output state, etc.). The fitness function may be designed to balance between the electrical power generated by the wind turbines and the structural load applied to the wind turbines. For example, data collected by a processing circuit may indicate a lower power demand during a certain period of time and the fitness function may find a solution that applies a lower structural load and generates less power during this time to be more fit than a solution that applies a larger structural load and generates more power during this time. Once a solution has been selected, the wind turbines may be controlled (e.g., by a processing circuit and/or another wind turbine controller) using set points that correspond with the selected solution.

Figure 2:
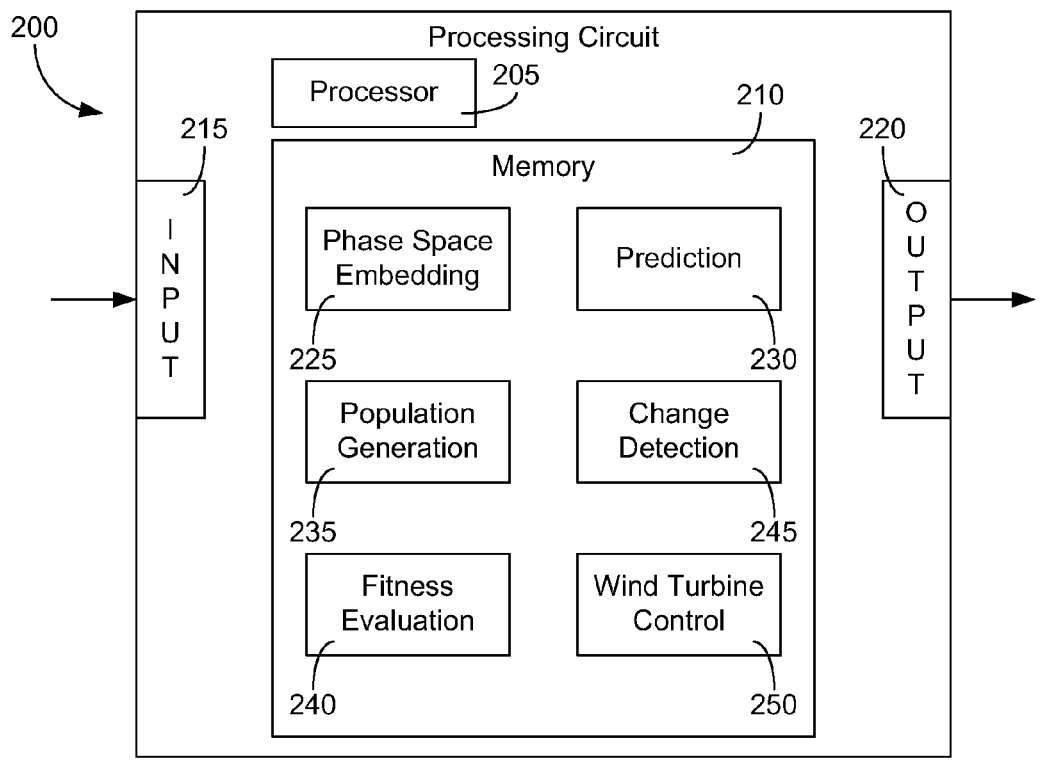
FIG. 2 is a block diagram of a processing circuit configured to control one or more wind turbines according to an exemplary embodiment.

Referring now to FIG. 2, a block diagram of a processing circuit 200 (e.g., an electronic processor) configured to control one or more wind turbines is shown according to an exemplary embodiment. Processing circuit 200 includes at least one processor 205, which may be any general purpose or special purpose processor (e.g., FPGA, CPLD, ASIC, etc.). In some embodiments, processor 205 may be chosen based on the type of application with which processing circuit 200 is being utilized. Processing circuit 200 also includes a memory 210 that may be any type of computer or machine-readable media (e.g., hard drive, flash memory, ROM, RAM, EEPROM, CD, DVD, etc.). Processing circuit 200 may also include an input interface 215 for receiving input data relating to the wind turbine(s) and an output interface 220 for outputting signals used to control the wind turbine(s). In some embodiments, processing circuit 200 may be networked to one or more other processing circuits. In some embodiments, processing circuit 200 and one or more other processing circuits may be employed to perform various operations (e.g., in a distributed computing environment).

Memory 210 may be configured to store one or more modules having instructions that are executable by processor 205. For example, memory 210 may include a phase space embedding module 225 configured to generate a reconstructed phase space and embed time series data for wind turbines being predicted within the reconstructed phase space. Once the reconstructed phase space has been generated and the data has been embedded in the reconstructed phase space, one or more future states of the system may be predicted using a prediction module 230. Prediction module 230 may be configured to predict the future states based on a rate of separation of trajectories in the embedded phase space (e.g., a rate of divergence or convergence of the trajectories).

Memory 210 may also include a population generation module 235 configured to generate a population of individuals for use in modeling the environment of the wind turbine(s). The fitness of each individual within the context of the wind turbine environment may be evaluated by a fitness evaluation module 240, and the population may be modified or adjusted and/or a best solution for controlling the wind turbine(s) may be selected based on the fitness evaluation. Memory 210 may also include a change detection module 245 configured to detect a change in the environment of the system or process being controlled by processing circuit 200. Change detection module 245 may be configured to modify the population and/or select a best solution for controlling the wind turbine(s) based on the detected environmental change. Memory 210 may also include a wind turbine control module 250 configured to control the operation of the wind turbine using diploid evolutionary control by interacting with modules 225, 230, 235, 240, and/or 245.

Figure 3:
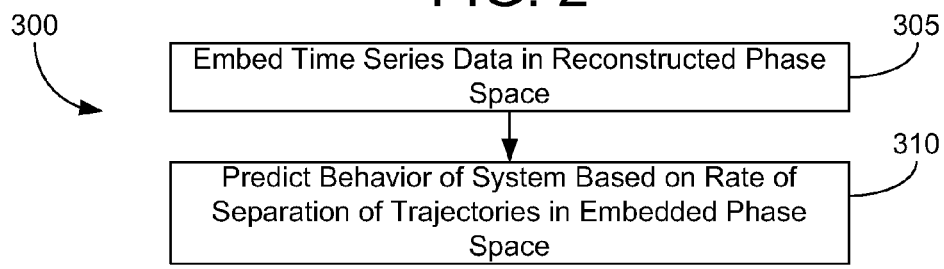
FIG. 3 is a flow diagram of a process for predicting the behavior of a system using a deterministic method according to an exemplary embodiment.

Referring now to FIG. 3, a flow diagram of a process 300 for predicting the behavior of a system using a deterministic method is shown according to an exemplary embodiment. Process 300 may be implemented using a deterministic algorithm executed by a processing circuit (e.g., processing circuit 200).

At step 305, time series data relating to a system being predicted is received and embedded within a reconstructed phase space. The time series data may be data relating to one or more aspects of the system being predicted that is measured at regular intervals. Time series data includes a series or sequence of data points, each of which is measured at and/or associated with a particular point in time. In some embodiments, time series data may be measured at regular periodic time intervals (e.g., 10 milliseconds, one second, 30 seconds, one minute, 15 minutes, one hour, one day, etc.). In the context of wind turbines and/or wind farm control, the time series data may be data relating to wind state (e.g., wind velocity and/or direction data), wind turbine system load data, energy generation data, and/or other types of data relating to the wind turbine(s). In some embodiments, reconstruction of the phase space is performed using at least two metrics, a time delay metric and a minimum embedding dimension. The time delay metric represents a time delay or time lag used to construct a new set of coordinates in the newly reconstructed phase space. The minimum embedding dimension represents a minimum number of dimensions that may be used to reconstruct, or unfold, the new phase space (e.g., the metric phase space) back to a multivariate phase space that is representational of the original phase. Once the time delay metric and minimum embedding dimension have been determined, a metric representing the rate of separation of trajectories in the new embedded phase space may be determined. In some embodiments, this metric may be a maximum Lyapunov exponent of the nonlinear system.

At step 310, the behavior of the nonlinear system (e.g., one or more future states of the nonlinear system) is predicted based on the rate of separation of trajectories in the embedded phase space. Future states of the system may be predicted by identifying a point in the reconstructed phase space as a current state of the system, finding one or more close points in the embedded phase space, and predicting a new state point based on the magnitude and/or direction of the maximum Lyapunov exponent of the system. In some embodiments, the new state point may be predicted based on a single nearest neighbor point identified in the embedded phase space. The new state point may be embedded within the embedded time series in the reconstructed phase space, and step 310 may be used to predict further future states of the nonlinear system. For wind turbine and/or wind farm implementations, the predicted new state points may represent predicted wind speed, predicted turbine structural load, predicted energy output, and/or other types of data relating to the wind turbine(s) that are predicted for particular time points or time periods in the future.

Figure 4A:
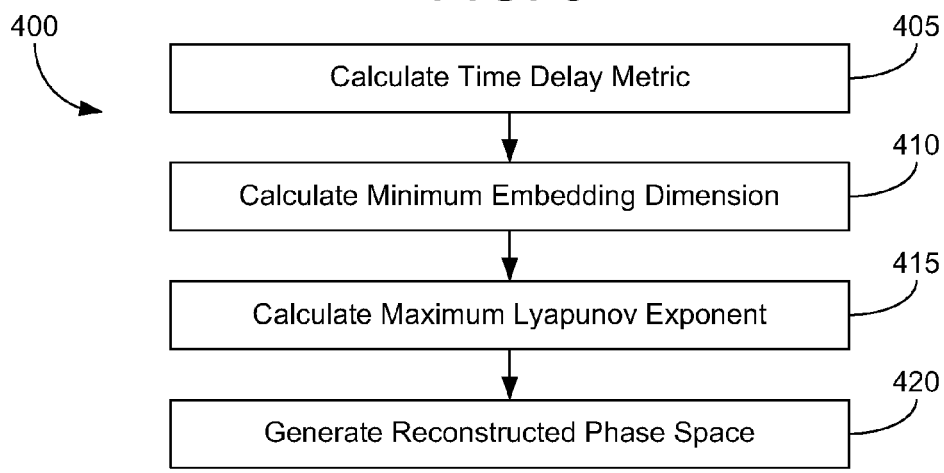
FIG. 4A is a flow diagram of a process for embedding data within a reconstructed phase space according to an exemplary embodiment.

Referring now to FIG. 4A, a flow diagram of a process 400 for reconstructing a phase space and embedding time series data in the reconstructed phase space is shown according to an exemplary embodiment. One or more steps of process 400 may be performed, for example, as part of step 305 of process 300. At step 405, a time delay metric, or delay factor, for use in embedding time series data within the reconstructed phase space is determined. The time delay metric represents a time delay or time lag used to construct a new set of coordinates in the newly reconstructed phase space. In some embodiments, a time delay metric τ may be calculated to be the first value for which an autocorrelation function (e.g., representing a cross-correlation of the time series data signal with itself as a function of time separation) falls below 1/e. The autocorrelation function may be represented as follows:

$$r_\tau = \frac{\sum_{l=\tau+1}^{n}(x_l - \bar{x})(x_{l-\tau} - \bar{x})}{\sum_{l=1}^{n}(x_l - \bar{x})^2}$$

In the above, $\bar{x}$ is the mean of the time series data, $x_t$ is the value of the data point x at time t, and r is the autocorrelation coefficient.

At step 410, a minimum embedding dimension for the reconstructed phase space may be determined. The minimum embedding dimension represents a minimum number of dimensions that may be used to reconstruct, or unfold, the new phase space (e.g., the metric phase space) back to a multivariate phase space that is representational of the original phase. A scalar time series for a given variable of the nonlinear system may be represented by the expression $x(n_i) = \{x_0, x_{0+\tau}, x_{0+2\tau}, \ldots, x_{0+(d-1)\tau}\}$. The time delay factor t may be calculated from the autocorrelation of the variable as described above with respect to step 405. The symbol d in the scalar time series expression for the variable x above is the minimal embedding dimension for which the scalar time series is most representational of the original phase space.

In some embodiments, a False Nearest Neighbors ("FNN") methodology may be used to calculate the minimum embedding dimension d. A FNN methodology is a procedure for obtaining the minimum embedding dimension for phase space reconstruction based on the neighborhood of points whose distance is below a given threshold ϵ. Consider a point $x(n)$ and a point $x^r(n) \in U(x(n))$ which is the $r^{th}$ nearest neighbor of $x(n)$ in the neighborhood of points around $x(n)$. The distance between these two points in d dimensional space may be calculated as follows:

$$R_d^2(n, r) = \sum_{k=0}^{d-1} (n + k\tau) - x^r(n + k\tau)^2$$

In the above, $\tau$ is the time delay factor from the autocorrelation function. In some embodiments, all points within the neighborhood of x(n) (e.g., within the threshold distance $\epsilon$) may be calculated.

The embedding dimension is then increased from dimension d to dimension d+1 such that, by time delay embedding, the (d+1)th coordinate is added to each of the vectors x(n). After the dimension is increased, the distance of each point x'(n)$\in$U(x(n)) to x(n) is again calculated. Those points whose distance to x(n) is larger than $\epsilon$ are removed from the neighborhood U(x(n)). The removed points are considered false nearest neighbors to x(n) since they were nearest neighbors in the smaller embedding dimension but are not nearest neighbors to x(n) when the embedding dimension is expanded. In some embodiments, the proper embedding dimension d is determined to be the smallest embedding dimension d in which no false nearest neighbors are discovered. In other embodiments, the proper embedding dimension d may be determined to be the embedding dimension d in which the number of false nearest neighbors discovered is less than a certain maximum threshold of false nearest neighbors.

Figure 4B:
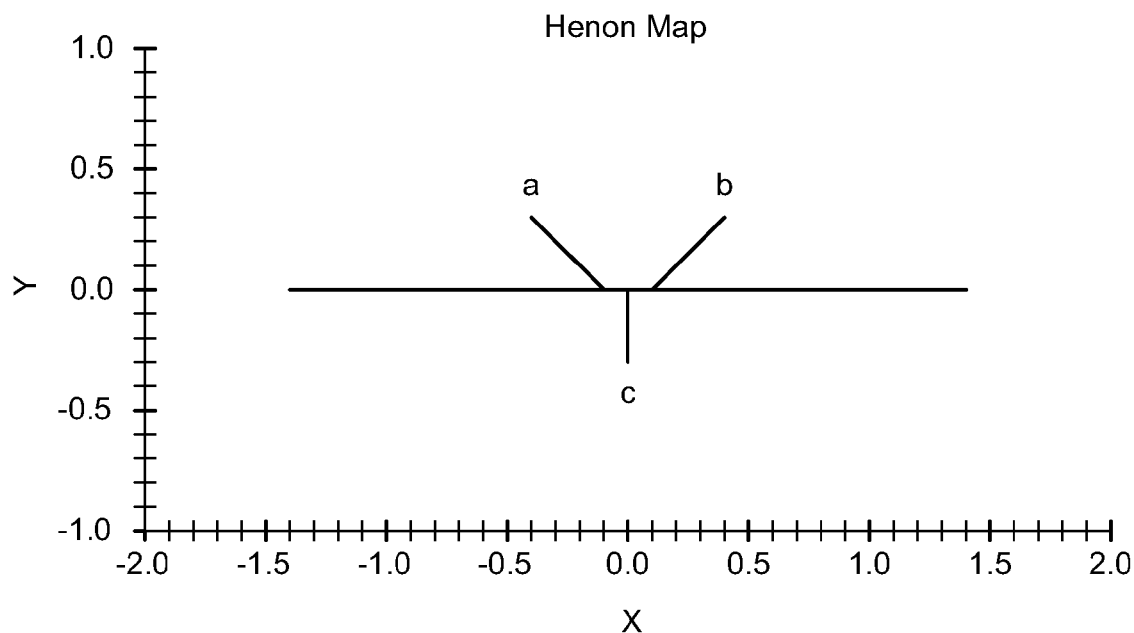
FIGS. 4B and 4C are Henon maps associated with a reconstruction of an example phase space using different embedding dimensions according to an exemplary embodiment.
Figure 4C:
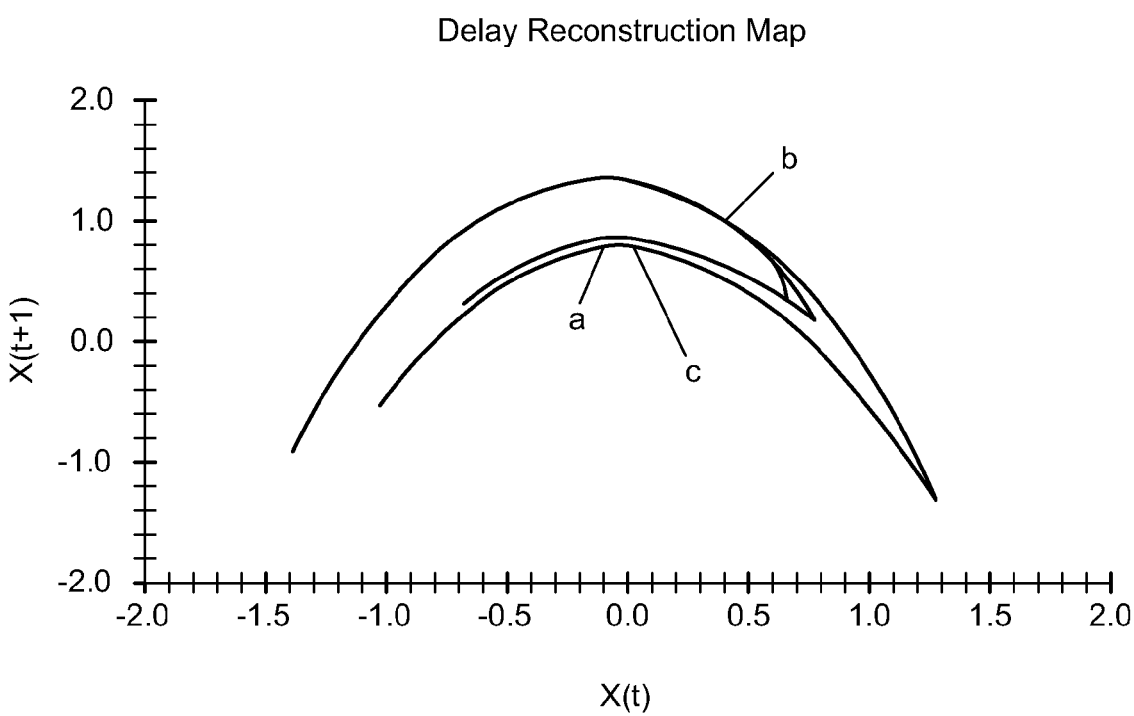

The operation of the FNN method may be illustrated with reference to FIGS. 4B and 4C. FIG. 4B illustrates a Henon map associated with a reconstruction of an exemplary phase space using only an x variable. For d=1, the reconstructed scalar phase space is a line. In d=1 dimension embedding space two points a and b are illustrated as being close to a point c. These points are nearest neighbors of c. However, when the embedding dimension d is increased to d=2, as illustrated in FIG. 4C, point a remains close to point c but point b is no longer in the neighborhood of point c. Point b was a false neighbor of point c in d=1 dimension embedding space due to the constriction of the embedding space.

Referring again to FIG. 4A, at step 415, a maximum Lyapunov exponent of the system is calculated. The maximum Lyapunov exponent is a measure of the rate of separation (e.g., divergence or convergence) of trajectories or orbits in the reconstructed phase space. Two trajectories $x(n_1)$ and $y(n_1)$ in the reconstructed phase space may be represented as follows:

$$x(n_i) = \{x_0, x_{0+\tau}, x_{0+2\tau}, \ldots, x_{0+(d-1)\tau}\}$$

$$y(n_i) = \{y_0, y_{0+\tau}, y_{0+2\tau}, \ldots, y_{0+(d-1)\tau}\}$$

The distance between $x(n_1)$ and $y(n_1)$ may be represented by a value $\epsilon$ (e.g., a small value). The distance between the trajectories at some time $\Delta n$ in the future may be represented by the following:

$$\epsilon_{\Delta n} = \|x_{n_1+\Delta n} - y_{n_1 \Delta n}\|$$

The maximum Lyapunov exponent $\lambda$ of the trajectories for the selected variable may be determined as follows:

$$\varepsilon_{\Delta n} \cong \varepsilon_0 e^{\lambda \Delta n}$$

or $$\lambda = \lim_{n \to \infty} \frac{1}{n} \sum_{n}^{\infty} \ln\left(\frac{\|x_{n_1+\Delta n} - y_{n_1+\Delta n}\|}{\|x_{n_1} - y_{n_1}\|}\right)$$

The above represents the maximum Lyapunov exponent $\lambda$ of the trajectories as n approaches $\infty$. In some embodiments, a more accurate maximum Lyapunov exponent may be calculated to determine the degree of non-linearity with the system by using a time series analysis of the Lyapunov exponent. Consider a time series T and a neighborhood $U(x(n_1))$ about a point $x(n_1) \in T$, such that each point $y_{n_1} \in U(x(n_1))$ has a distance from $x(n_1)$ of some small value $\epsilon$. The Lyapunov exponent of the time series T can be calculated as follows:

$$\lambda \approx \frac{1}{N} \sum_{n_0=1}^{N} \ln\left(\frac{1}{|U(x(n_1))|} \sum_{y_n \in U(x(n_1))} |x_{n_0+\Delta n} - y_{n+\Delta n}|\right)$$

For $\lambda<0$, the trajectories are periodic and the system is not chaotic. For $\lambda=0$, the system approaches a marginally stable point. If $\lambda>0$, the two trajectories are diverging from one another at an exponential rate, the system is chaotic, and the degree of non-linearity of the system containing $x(n_1)$ and $y(n_1)$ may be estimated exponentially by the maximum Lyapunov exponent $\lambda$. For a given system, there are as many Lyapunov exponents as there are dimensions in the phase space of the system.

Referring still to FIG. 4A, at step 420, the reconstructed phase space may be generated. The reconstructed phase space may be generated by selecting one variable of the system and generating a set of d dimensional vectors of the form $\bar{x} = \{x_i, x_{i+\tau}, \ldots, x_{i+d\tau}\}$ where $\tau$ is the time delay calculated at step 405 and d is the minimum embedding dimension calculated at step 410. The Lyapunov exponent calculated at step 415 is indicative of the rate of divergence or convergence of the nearby trajectories in the embedded phase space. In some embodiments, this divergence or convergence may be visible in a plot of the embedded phase space. In other embodiments, higher dimension phase spaces may not be plotted. In such embodiments, the Lyapunov exponent may provide an understanding of the phase space that may be useful in the prediction of new future data points.

Figure 5A:
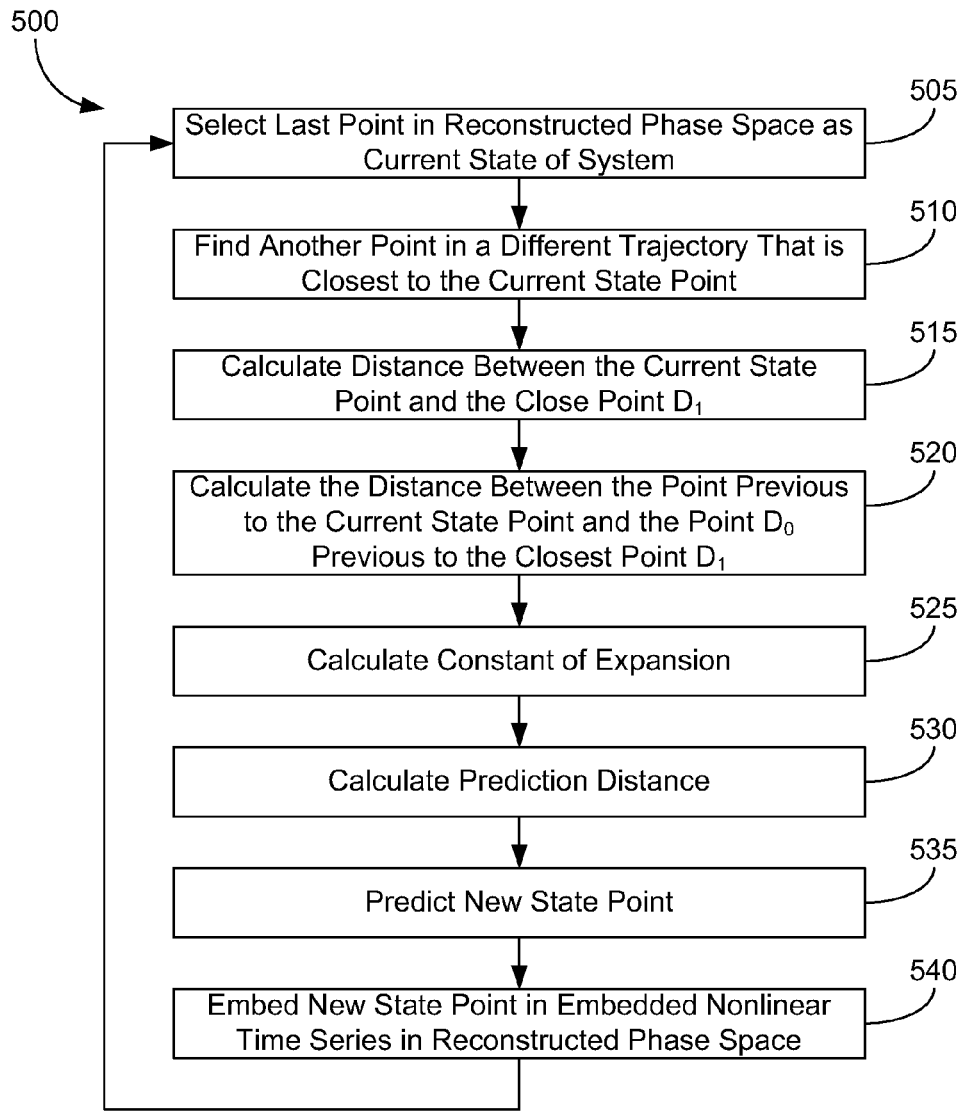
FIG. 5A is a flow diagram of a process for predicting the behavior of a system using data embedded within a reconstructed phase space according to an exemplary embodiment.

Referring now to FIG. 5A, a flow diagram of a process 500 for predicting the behavior (e.g., one or more future state points) of a system using data embedded within a reconstructed phase space is shown according to an exemplary embodiment. One or more steps of process 500 may be performed, for example, as part of step 310 of process 300. At step 505, a point (e.g., the last point) in the reconstructed phase space is selected as the current state of the system. At step 510, another point is located in a different trajectory than the selected current state point that is close (e.g., within a predefined distance), or closest, to the current state point. The close point may be determined using any distance metric, such as Euclidean Distance. In some embodiments, the close point may reside on an orbit external to that of the current state point. Whether or not the orbit resides on an orbit external to that of the current state point may be determined through a time delay of mean orbit length.

At step 515, the distance $D_1$ between the current state point and the close point is calculated. At step 520, the distance $D_0$ between the point previous (e.g., immediately previous) to the current state point on the trajectory of the current state point and a point previous to the closest point on the trajectory of the closest point is calculated. At step 525, a constant of expansion c is calculated based on $D_1$ and $D_0$, which may be calculated according to the following:

$$c = \frac{\ln|D_1 - D_0|}{\lambda}$$

Again, in the expression above, $\lambda$ is the previously calculated Lyapunov exponent (e.g., at step 415 of process 400) relating to the rate of separation of trajectories in the system. At step 530, a prediction distance $D_p$ is calculated based on the determined constant of expansion c, which may be calculated according to the following:

$$D_p + D_1 + e^{c\lambda}$$

At step 535, a new future state point is predicted based on the determined prediction distance $D_p$. The new state point may be predicted to be a distance $D_p$ from the current state point in the direction of the maximum Lyapunov exponent $\lambda$. The direction of the maximum Lyapunov exponent $\lambda$ may be determined by generating a neighborhood U around the closest point determined at step 510. The direction of the maximum Lyapunov exponent is in the direction of the major axis of the ellipsoidal hypersphere. In a chaotic system, the direction of the maximum Lyapunov exponent is the direction of divergence of the trajectory.

Figure 5B:
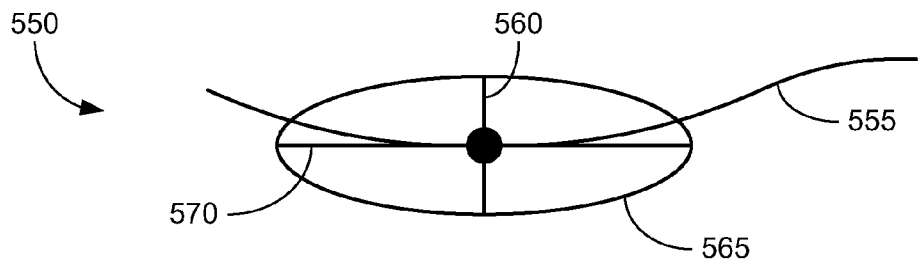
FIG. 5B is an illustration of a point on a trajectory and a neighborhood around the point according to an exemplary embodiment.

FIG. 5B illustrates an exemplary embodiment including a trajectory 555 with a closest point 560. The neighborhood U forms an ellipsoidal hypersphere 565 with the major axis as a tangent to the closest point. The predicted point utilizes the tangent of the closest point to determine its location within the embedded phase space. The tangent determines the first coordinate of the predicted point. The second coordinate is determined to be orthonormal to the tangent. The remaining coordinates correspond to the direction of the remaining axes whose length is that of their corresponding eigenvalues.

Referring again to FIG. 5A, at step 540, the new state point is embedded in the nonlinear time series in the reconstructed phase space. The new state point may then be used as the current state point and prediction may continue by repeating (e.g., iteratively) process 500. The length of predictability may depend on the magnitude of the Lyapunov exponent. The larger the Lyaponov exponent is, the shorter the accurate prediction time frame may become.

Figures 6, 7:
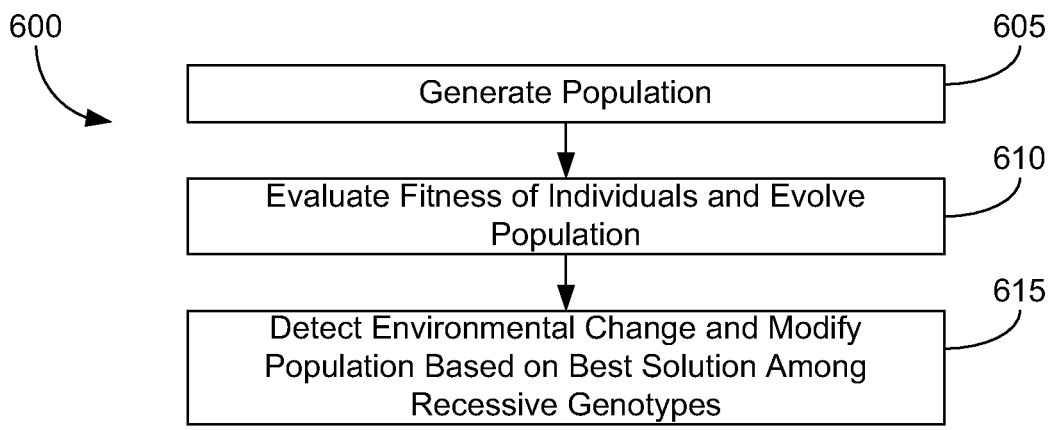
FIG. 6 is a flow diagram of a method of controlling a process using a diploid evolutionary algorithm according to an exemplary embodiment.
FIG. 7 is a flow diagram of a method of generating a population of individuals for use in controlling a process according to an exemplary embodiment.

Referring now to FIG. 6, a flow diagram of a method 600 for controlling a system or process using diploid evolutionary control is shown according to an exemplary embodiment. In some embodiments, method 600 and/or other methods or processes disclosed herein may be implemented using a diploid evolutionary algorithm executed by a processing circuit (e.g., processing circuit 200).

At step 605, a population of individuals is generated (e.g., by population generation module 225) to model the environment being controlled. Each individual may store one or more genotypes that may be values representing solutions for controlling the operation of a system associated with the environment. In the context of wind turbines, each solution may represent a value that defines one or more set points for the wind turbines used to manipulate the structural load of the turbines and/or the electrical power generated by the turbines.

Evolutionary computation algorithms have been represented using a haploid representation in which each individual is represented by a single genotype. In the case of a genetic algorithm with binary bit string definitions, a haploid representation of each organism may be defined as follows:

$$ind_i = \{x_1, x_2, \ldots, x_n\} \text{ with } n \in R^2 \text{ and } x \in \{0,1\}$$

In this definition, $ind_i$ is the $i^{th}$ individual or organism in the population of the genetic algorithm. At each iteration of the genetic algorithm, the haploid genotype is evaluated against an optimization function and then subjected to evolution via mutation and crossover. During the run of the evolutionary algorithm, the haploid representation may constantly be searching for the global optima of the search space.

In method 600, each individual in the population is represented using a diploid representation such that each individual has associated therewith both a dominant genotype and a recessive genotype. In one embodiment, the population may include solutions (e.g., controller set points) for controlling the operation of one or more wind turbines over a particular time period, and each individual may be configured to store two sets of wind turbine control set points, one in each of the dominant and recessive genotypes. The dominant genotype of each individual may be used in evaluation and implementation of the current control solution, while the recessive genotype of each individual may be used to memorize previously encountered environments. Each individual in the population of a genetic algorithm with binary bit string definitions may be defined as follows:

$$ind_i = \begin{cases} x = \{x_1, x_2, \ldots, x_n\} \\ y = \{y_1, y_2, \ldots, y_n\} \end{cases} \text{where } x_j, y_j \in \{0, 1\}$$

The vector x represents the dominant genotype and the vector y represents the recessive genotype of individuals in the population. In embodiments in which method 600 is applied to control wind turbines, each of the dominant genotype and the recessive genotype may represent possible control signals or set points for changing the structural load on the wind turbines and/or the power generated by the wind turbines.

Referring now to FIG. 7, a flow diagram of a method 700 including operations that may be performed as part of step 605 of method 600 is shown according to an exemplary embodiment. At step 705, a population of individuals having a diploid, or two genotype, representation is generated. The dominant genotype of each individual is populated with an initial genotype (step 710). In some embodiments, the dominant genotype may be randomly generated for each individual in the population. Utilizing randomly generated dominant genotypes may increase diversity of the achieved solution. The recessive genotype may be set to be empty, or null (step 715).

In some embodiments, further individuals may be generated and inserted or injected into the population after the initial population has been generated (step 720). As with the individuals initially generated for the population, the additional individuals, or emigrants, may be assigned a randomly generated dominant genotype and an empty recessive genotype. Injecting new randomly defined individuals into the population may enhance the diversity of the population and/or promote exploration of the environment by the algorithm. One or more new individuals may be injected into the population at predefined times, periodically, based on specified conditions, randomly, etc. In some embodiments, the frequency with which new individuals are generated and/or the number of individuals generated may be based on a defined probability (e.g., a user-defined probability).

Referring again to FIG. 6, at step 610, the fitness of each individual in the population for the environment being controlled is evaluated. Fitness evaluation may be performed on the dominant genotype of each individual. Fitness evaluation may be performed based on a fitness or optimization function configured to identify the fitness of each individual for the problem being solved or the process, system and/or environment being controlled. In some embodiments, the output of the fitness function may be proportional to the fitness of the individual to which the fitness function is applied for the solution being sought (e.g., such that a higher fitness function output indicates a more fit individual for the solution).

In various different embodiments, fitness functions may be modified and/or customized to particular applications and/or parameters. In various wind turbine-related embodiments, fitness functions may be configured to evaluate the fitness of control solutions based on anticipated power demand, a goal of prolonging the operational life of the wind turbine, anticipated weather conditions, and/or other factors. According to various exemplary embodiments, fitness functions may be directed to a single objective or multiple objectives and may be defined explicitly for a problem or application under consideration.

Parents are selected for evolution based on the results of the fitness evaluation of each individual in the population. Once the parents have been selected, the population is evolved by performing recombination and mutation on the selected parents until a new or updated population has been generated.

In some embodiments, fitness evaluation may be performed to determine a solution for controlling one or more wind turbines. Each genotype evaluated may represent a different control signal or one or more set points that may be used to control the wind turbines. The fitness function used to evaluate the genotypes may be based on current, historical, and/or predicted wind data (e.g., wind velocity data), structural load data, energy generation data, and/or other types of wind turbine environmental data. The fitness function may use predicted state data (e.g., predicted wind velocity, structural load, energy production, etc.) and/or other types of data to determine one or more good solutions (e.g., wind turbine set points) for controlling the wind turbine under current and/or predicted environmental conditions of the wind turbines. In some embodiments, the fitness function may be designed to balance the structural load placed on the wind turbines (which may decrease the life of the wind turbines as it is increased) with the energy generated by the wind turbines. One or more good solutions for the current and/or predicted wind turbine conditions may be identified using the fitness function, and the corresponding control signal or set points may be used to control the wind turbines. The selected genotype(s) may be used to evolve the population and arrive at other good control solutions for the wind turbines.

Figure 8:
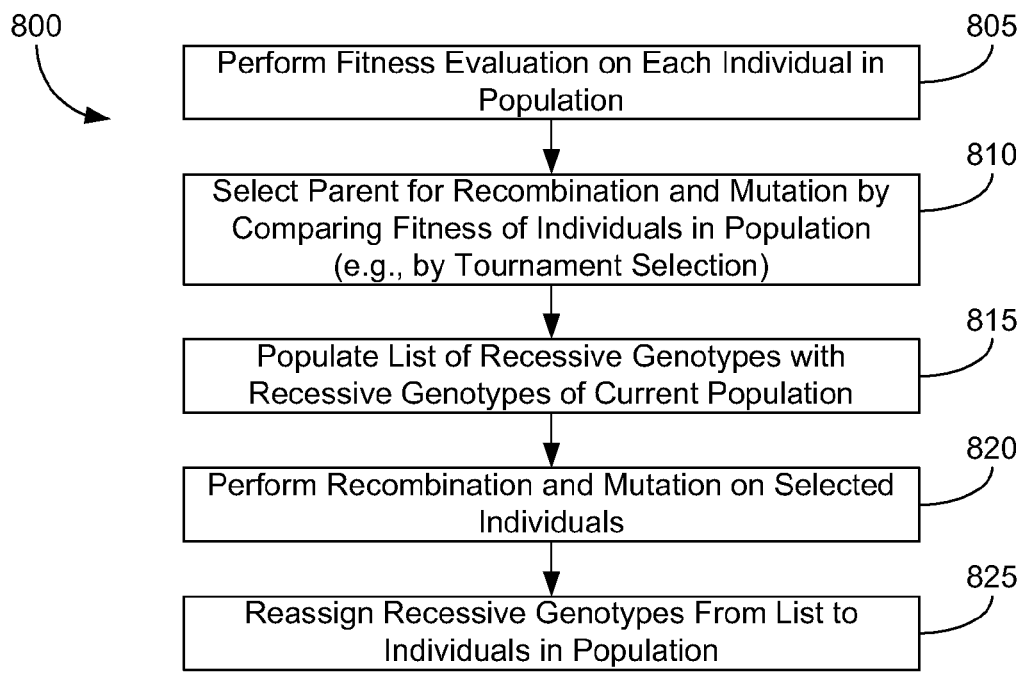
FIG. 8 is a flow diagram of a method of evaluating the fitness of a population of individuals and modifying the population based on the fitness evaluation according to an exemplary embodiment.

Referring now to FIG. 8, a flow diagram of a method 800 including operations that may be performed as part of step 610 of method 600 is shown according to an exemplary embodiment. At step 805, a fitness evaluation is performed on each individual in the population. The fitness evaluation may be performed by applying a fitness or optimization function to the dominant genotype of each individual.

Parents are then selected for recombination and mutation based on the results of the fitness evaluation of each of the individuals (step 810). In some embodiments, parents may be chosen through a tournament selection process. In the tournament selection process, individuals may be arranged in a tournament style such that adjacent pairs of individuals compete head-to-head, or are compared against each other for fitness. The individual with the greater fitness in each comparison proceeds to the next round to face another individual, and this process continues until a "winner" of the tournament, or best individual, is decided. The tournament algorithm may construct a tournament tree reflecting the tournament comparisons. The second-best individual must be among the direct losers to the best individual. These direct losing individuals may be determined by stepping through the first tournament tree and a second tournament may be held between the direct losing individuals to determine a second-best individual. The third-best individual must be among the direct losers of the second-best individual in either the first or second tournament trees, and another tournament may be held to determine the third-best individual. This process continues until the desired amount of parent individuals has been obtained. In some embodiments, each parent chosen for recombination and mutation of the n individuals in the population may be provided as follows:

$$\text{selected}_j = \text{argmax}_i f(i)$$

In the above, $f(i)$ is the fitness of the $i^{th}$ individual in the population as measured against the fitness function. In some embodiments, two individuals will be selected for evolution of the population. In other embodiments, more than two (e.g., four, eight, etc.) will be chosen for recombination and mutation. In some embodiments, selection methods other than tournament selection may be used to select individuals from the population (e.g., roulette wheel, probabilistic weighting, etc.). In various embodiments, any selection methodology that accounts for the fitness of the individuals in relation to the fitness function may be used.

The recessive genotypes of the current population may be saved in a list of recessive genotypes (step 815) and recombination and mutation may be performed on the dominant genotype of the individuals of the population (step 820). Recombination may be performed by crossing over portions (e.g., bits for a bit string population) of the dominant genotype of the selected parents to generate new individuals for the evolved population. In some embodiments, a crossover rate may be provided (e.g., user-defined, predefined, random, etc.) upon which the crossover of parents may be based. The parents and/or new individuals may also be subjected to mutation by flipping (e.g., randomly) the allele of one or more loci of the dominant genotype. For binary bit string individuals, for example, mutation may involve randomly flipping the value of one or more bit string positions in the dominant genotype. The determination of which values to flip may be based upon a probability that is provided as a parameter. The recessive genotypes added to the recessive genotype list may be reassigned to individuals within the newly evolved population (step 825). In some embodiments, the recessive genotypes may be reassigned to individuals within the newly evolved population at random. Storing recessive genotypes at the time of performance of an evolutionary algorithm may be referred to as utilizing explicit memory.

Referring again to FIG. 6, environmental changes may be detected and the current population may be modified based on the best or most fit solution among the recessive genotypes in the population (step 615). A change in the environmental conditions may be detected by monitoring the best fitness of the population (e.g., the fitness of the most fit individual based on the evaluation of the dominant genotype of each individual against the fitness function) for changes. When a substantial change, or a best fitness change above a particular threshold, is detected, the current best solution (e.g., the dominant genotype of the individual having the best fitness) may be saved within the recessive genotype of one of the individuals in the population and the best solution to the new changed environment may be determined from among the recessive genotypes of the current population. The population may be evolved based on the newly determined best saved solution.

In the context of a wind turbine control application, the detected change in conditions may correspond to a change in wind velocity, predicted structural load, required energy output, and/or other changes in wind turbine environment conditions. The best solution(s) of the previous generation (e.g., the control signal determined most fit to control the wind turbines under the previous wind, load, energy production, and/or other environmental conditions) is saved in a recessive genotype of an individual in the population. Other good solutions to previously encountered environmental conditions of wind, load, energy production, etc. may be stored in recessive genotypes in the population. The recessive genotypes may be evaluated to determine if a recessive genotype contains a solution (e.g., control signal or group of set points) that is well fit to control the wind turbines (e.g., corresponds to conditions of wind, load, energy production, etc. that are similar to the changed conditions). The best control solution from the recessive genotypes may be selected to control the wind turbines and/or evolve the population.

Figure 9:
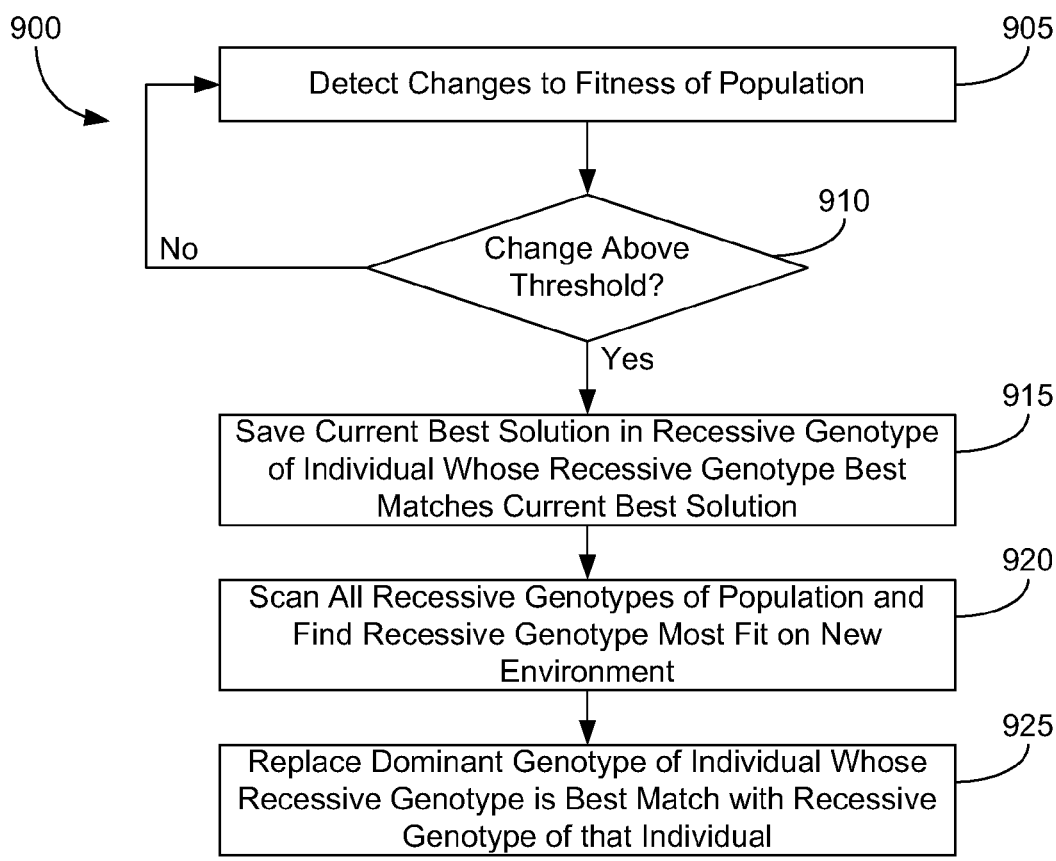
FIG. 9 is a flow diagram of a method of detecting and reacting to an environmental change of a controlled process according to an exemplary embodiment.

Referring now to FIG. 9, a flow diagram of a method 900 including operations that may be performed as part of step 915 of method 900 is shown according to an exemplary embodiment. At step 905, the fitness of the population is monitored (e.g., periodically, continually, after the occurrence of specified events or upon detection of particular input values, etc.) to detect any changes to the environment being monitored and/or controlled. A parameter or threshold $\epsilon$ may be provided (e.g., user-supplied, predefined, etc.) and used to determine whether a decrease in the best fitness of the population signifies a significant environmental change such that a new best solution should be determined from a history or memory of previous solutions stored in the recessive genotypes of individuals in the current population. In some embodiments, a substantial change is detected as follows:

$$change = \begin{cases} true & if \ f(t) - f(t-1) > \varepsilon \\ false & otherwise \end{cases}$$

In the above, f(t) is the fitness of the best individual in the population at time t and f(t−1) is the fitness of the best individual in the population at a time prior to t. At step 910, it is determined whether a change above the threshold has been detected. If not, the best fitness of the population continues to be monitored (step 905).

The recessive genotypes of each of the individuals of the population operate to store a memory or history of previous environments. Specifically, the recessive genotypes are used to store previously encountered genotypes (e.g., dominant genotypes), such as dominant genotypes of best fit individuals from previous generations of the population.

If a change above the threshold has been detected, the current best solution, or dominant genotype of the individual in the current population having the best fitness, is saved in the recessive genotype of the individual of the population having a recessive genotype that most closely matches the current best solution (step 915). If the detected change is the first above-threshold change detected in the running of the diploid evolutionary algorithm, such that all recessive genotypes are set to empty or null, then all individuals in the population may have their recessive genotypes populated with the dominant genotype of the most fit individual in the previous generation (e.g., the most fit individual at time t−1). If the detected change is not the first change, the recessive genotypes of the current population may be scanned to find the recessive genotype that is most similar to the dominant genotype of the most fit individual in the previous generation.

In some embodiments, a metric similar to Hamming similarity may be used for the similarity determination, such as the following:

$$similarity_i = \sum_{j=0}^{N} \begin{cases} 1 & if \ ind_{ij} = best_j \\ 0 & otherwise \end{cases}$$

In the exemplary embodiment shown above, the comparison of the allele (e.g., value) of the $j^{th}$ loci (e.g., bit string position) of the individual under consideration is made to the allele of the $j^{th}$ loci of the best individual of the previous generation. Each of N loci in the individual under consideration are compared to the corresponding N loci of the best individual of the previous generation (i.e., a bit-wise comparison of the genotypes is performed). The similarity measure is determined based on the total number of similar bits found in the comparison. In other embodiments, other similarity measures may be utilized. Ties in similarity may be broken at random or based on parameters provided to the algorithm. Once the individual having the most similar recessive genotype is found, the recessive genotype is set to be the dominant genotype of the best fit individual of the previous generation.

At step 920, the recessive genotypes of each of the individuals in the current population are evaluated for fitness in current environmental conditions by applying the fitness function to the recessive genotypes. Once the recessive genotype of best fitness in the current environment is identified, the individual having the most fit recessive genotype has its dominant genotype replaced with its recessive genotype (step 925). In some embodiments, more than one most fit recessive genotype may be identified (e.g., the top 5, 10, 12, n, etc. most fit recessive genotypes) and the corresponding individuals may have their dominant genotypes replaced with the recessive genotypes. The replacement of dominant genotypes by the recessive genotypes assists in convergence if the current environment is similar to one that was previously encountered.

In some embodiments, mutation (e.g., at step 820 of method 800) may include a hypermutation in which an individual's dominant genotype may assume the value of its recessive genotype. The probability that an individual will undergo such a hypermutation may be provided as a parameter to the evolutionary algorithm. In some embodiments, the probability may be set to be relatively small, such that this form of hypermutation happens infrequently. This form of mutation may help increase the diversity of the current population as well as assist in possible anticipation of environmental changes.

Figure 10:
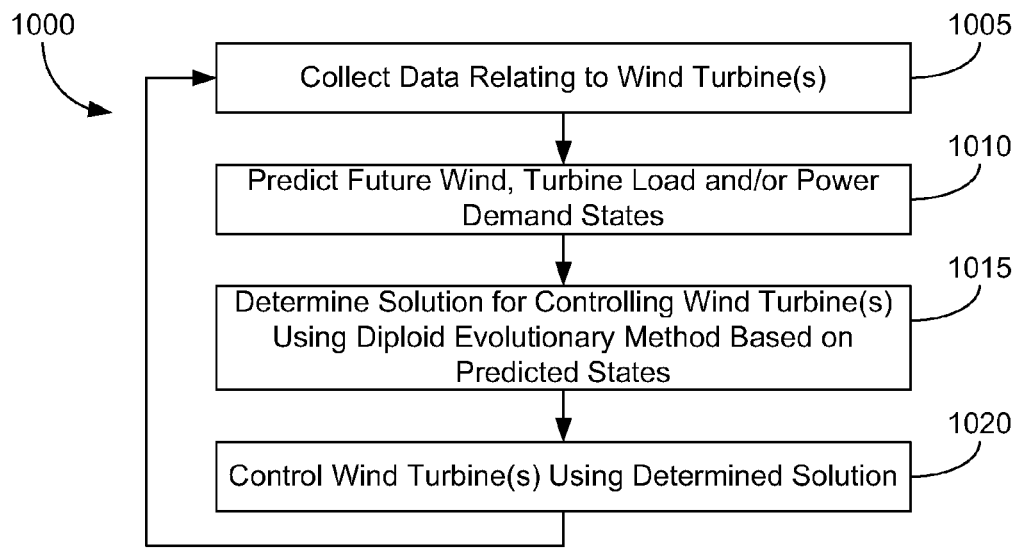
FIG. 10 is a flow diagram of a process for controlling the operation of one or more wind turbines according to an exemplary embodiment.

Referring now to FIG. 10, a flow diagram of a process 1000 for controlling one or more wind turbines using future state prediction and diploid evolutionary control is shown according to an exemplary embodiment. Process 1000 may be implemented using instructions executed by a processing circuit (e.g., processing circuit 200). In some embodiments, process 1000 may be used to control a single wind turbine. In other embodiments, process 1000 may be used to control multiple wind turbines (e.g., a wind farm or a system of multiple wind farms).

At step 1005, data relating to the wind turbine being controlled may be collected. The data may relate to wind state in the area of the turbine, the state of the system loads on the turbine, the power being demanded from the electrical grid to which the turbine is connected, and/or other types of data.

According to various embodiments, the data collected may be related to wind speed, wind turbine set points, bearing temperatures, generator speed, driveshaft speed, torque, tower deflection, Supervisory Control and Data Acquisition System (SCADA) variables, etc. In some embodiments, data may be received from a SCADA system in real time or quasi-real time. Data received from SCADA systems may vary based on the type of SCADA system. The collected data may include time references or may be time-stamped by a processing circuit performing process 1000.

At step 1010, one or more future turbine states (e.g., wind state, turbine system load state, power demand state, etc.) may be predicted for use in controlling the wind turbine. The future states may be predicted using a chaotic attractor in an embedded phase space. The future states may be predicted using a method similar to process 300. The data collected at step 1005 (e.g., time series data) may be embedded in a reconstructed phase space. The embedded data may be used to predict future states related to the turbine being controlled based on the rate of separation between trajectories in the reconstructed phase space (e.g., based on the maximum Lyapunov exponent of the system).

At step 1015, the predicted turbine states are used to determine a solution for controlling the wind turbine through a diploid evolutionary method. Control agents may be used to call an explicit diploid evolutionary algorithm to determine an appropriate solution. The solution may be determined using a method similar to method 600. A population of diploid individuals having a dominant genotype and a recessive genotype may be generated and the dominant genotype of each of the individuals may be populated with a value representing a solution for controlling the wind turbine. The solutions may be evaluated against a fitness function to determine which solution is most fit for current conditions of the wind turbine. The output of the fitness function may vary based on wind state, turbine system loads state, power demand state, and/or other data of interest in controlling the wind turbine. In some embodiments, a multi-objective fitness function may be used that incorporates wind farm and/or turbine level goals for balancing between electrical power output and structural loads on the wind turbines. The best fit solution (e.g., dominant genotype) under the fitness function may be selected to control the wind turbine. The most fit individual may also be used to evolve (e.g., recombine and mutate) the population to determine other best fit solutions.

When changes occur in the wind turbine environment, the best fit solution(s) may be saved in the recessive genotype of one or more individuals in the population. The best fitness of the population may be monitored to detect changes in the wind turbine environment. If a substantial change is detected, the previous best fit solution may be saved in a recessive genotype and the recessive genotypes may be scanned to determine if a better fit solution exists. If a better solution exists among the recessive genotypes, that solution may be selected for controlling the wind turbine and/or evolving the population.

At step 1020, the determined best solution may be used to control the wind turbine(s). In some embodiments, set points of the wind turbine may be altered manually (e.g., by a human technician) to implement the determined best solution. In other embodiments, the set points may be altered automatically (e.g., by a processing circuit) based on the determined best solution and/or other customer requirements.

Figure 11:
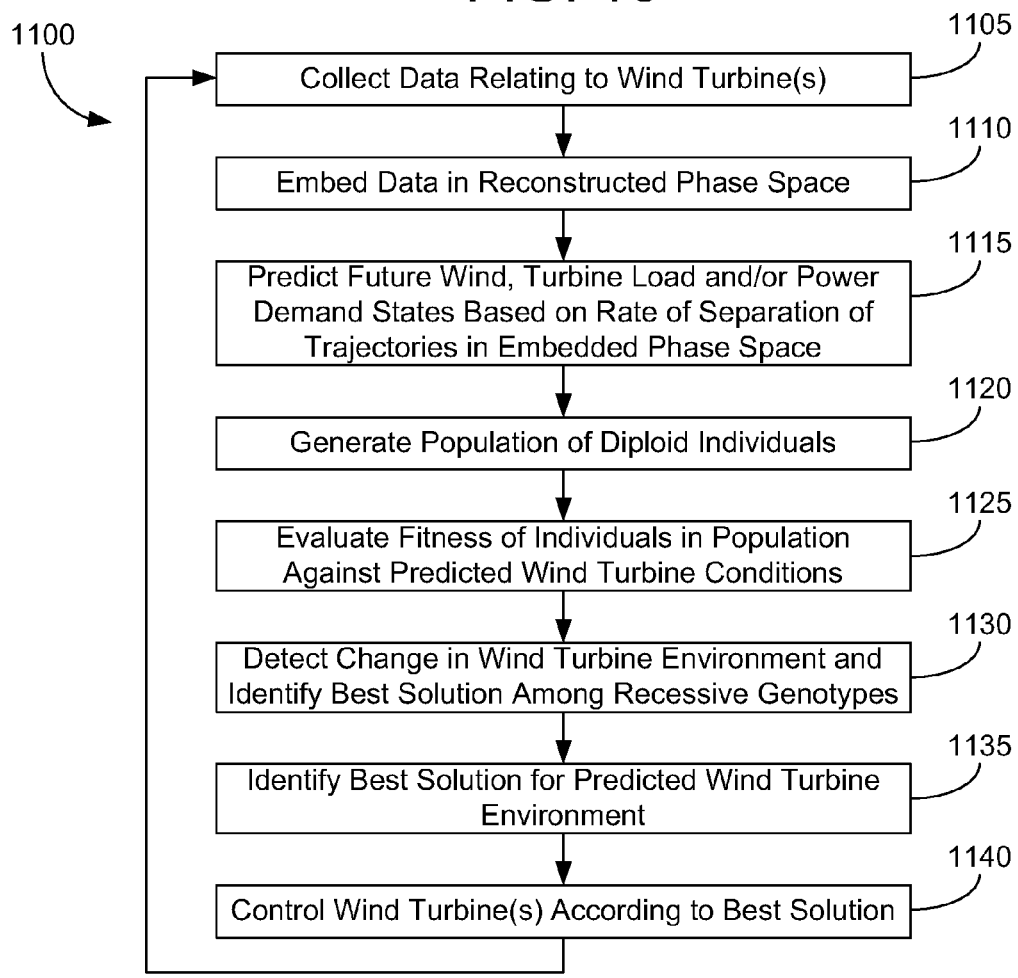
FIG. 11 is a more detailed flow diagram of a process for controlling one or more wind turbines according to an exemplary embodiment.

Referring now to FIG. 11, a more detailed flow diagram of a process 1100 for controlling one or more wind turbines using future state prediction and diploid evolutionary control is shown according to an exemplary embodiment. Process 1100 includes operations that may be used to implement one or more operations of process 1000. Process 1100 may be implemented using instructions executed by a processing circuit (e.g., processing circuit 200).

At step 1105, data relating to one or more wind turbines is collected for use in controlling the wind turbines. The data may relate to wind state in the area of the turbine, the state of the system loads on the turbine, the power being demanded from the electrical grid to which the turbine is connected, and/or other types of data.

At step 1110, the collected data (e.g., time series data) is embedded into a reconstructed phase space. Phase space reconstruction and data embedding may be performed in a manner similar to process 400.

Future wind, turbine structural load, power demand, and/or other states are predicted based on the rate of separation of trajectories in the embedded reconstructed phase space (step 1115). State prediction may be performed in a manner similar to method 500. The nearest neighbors to the current state point (e.g., the last point in the reconstructed phase space) may be determined, and the distances between the current state point and its nearest neighbors may be calculated. New state points may be predicted (e.g., iteratively) based on the determined distances (e.g., according to steps 515 through 540 of process 500).

The predicted turbine states may be used to determine one or more best solutions for controlling the wind turbine(s). At step 1120, a population of diploid individuals having a dominant genotype and a recessive genotype are generated (e.g., according to a method similar to method 700). In some embodiments, the dominant genotype may be populated with a randomly generated solution for controlling the wind turbine and the recessive genotype may be initially left empty.

At step 1125, the fitness of each of the solutions (e.g., dominant genotypes) for the current environmental conditions of the wind turbine (e.g., wind state; structural load state, power demand state, etc.) is evaluated. The fitness of each solution may be evaluated according to a method similar to method 800. The fitness of each solution may be evaluated using a fitness function configured to provide an output value that is based on the fitness of the input solution to achieve the desired operation of the wind turbine. The best solution may be selected for use in controlling the wind turbine (step 1135). The best solution may also be used to evolve the population to determine other possible best solutions.

At step 1130, changes in the wind turbine environment may be detected and the solution used to control the wind turbine may be altered based on the changed environment (e.g., in a manner similar to method 900). In some embodiments, changes in the wind turbine environment may be detected based on monitored inputs (e.g., using input interface 215 of processing circuit 200) from sensors associated with the wind turbine or wind farm. In other embodiments, changes in the wind turbine environment may be detected by monitoring the best fitness of the population in a manner similar to steps 905 and 910 of method 900.

Previous best solutions (i.e., best solutions associated with previously encountered turbine environments) may be stored in the recessive genotypes of the individuals in the population. If a substantial change in the environment is detected, the previous best solution (e.g., dominant genotype of the most fit individual under the environment before the detected change) may be stored in a recessive genotype (e.g., according to step 915 of method 900). The recessive genotypes of the population may be scanned to determine if any of the recessive genotypes is fit (e.g., best fit) for the changed turbine environment (e.g., according to step 920 of method 900). The best fit solution of the recessive genotypes may be copied into a dominant genotype (e.g., according to step 925 of method 900) and may be identified as the best solution to control the turbine (step 1135) and/or evolve the population to determine other solutions. Once a solution has been identified, the wind turbine(s) may be controlled (e.g., by changing set points associated with the wind turbine(s)) according to the determined solution (step 1140).

Various exemplary embodiments disclosed herein utilize linear deterministic forecasting methods to predict future states of systems such as wind that exhibit chaotic behavior. In some embodiments, such methods may produce a more accurate prediction of wind turbine power output and other parameters than stochastic methods (e.g., neural networks and/or machine learning techniques).

Various exemplary embodiments disclosed herein utilize diploid evolutionary methods to determine most fit solutions to differing environments using a fitness function and/or store a history of best solutions to previously encountered environments. In some embodiments, such diploid evolutionary methods may be used to create a hierarchical control schema based on learned behavior of an individual wind turbine, wind farm (i.e., system of wind turbines), and/or system of wind farms. The hierarchical control schema may be configured to optimize individual turbines according to individual operating characteristics and/or optimize turbines at a farm or system level in relation to the effect they produce on one another as a function of meteorological conditions. The control schema may be configured to optimize the power output and/or structural load parameters of the wind turbines to achieve a desired turbine life cycle, cost outcome, and/or power generation.

Various exemplary embodiments disclosed herein may enable wind turbine systems to predict and prevent serious faults. Wind turbine systems may not act upon operational data in a near real time manner. Failures may be allowed to cascade to serious system failure. Exemplary embodiments disclosed herein utilize explicit diploid evolutionary methods that may be configured to learn fault patterns correlated with turbine operating parameters and choose solutions (e.g., using the fitness function) that will avoid the faults.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium (e.g., non-transitory medium) which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A method of controlling at least one wind turbine, comprising:
   predicting at least one future state related to the at least one wind turbine;
   evaluating a fitness of solutions associated with a plurality of individuals of a population for a current operating environment of the at least one wind turbine, each individual comprising a dominant genotype and a recessive genotype, wherein each genotype represents a solution of the solutions associated with the plurality of individuals for controlling at least one wind turbine, wherein a fitness function is applied to the dominant genotype of each individual, wherein the fitness function is based on the at least one future state;
   storing previously encountered genotypes in the recessive genotypes of the individuals; and
   selecting a solution of the solutions associated with the plurality of individuals for controlling the at least one wind turbine based on the evaluating of the fitness solutions,
   wherein predicting the at least one future state comprises:
      collecting data related to operation of the at least one wind turbine;
      embedding the data in a reconstructed phase space to provide embedded data; and
      predicting the at least one future state based on a rate of separation of trajectories of the embedded data within the reconstructed phase space.

2. The method of claim 1, wherein the data comprises data relating to at least one of a wind state, a wind turbine system load state, and a power demand state.

3. The method of claim 2, wherein the data is collected from a supervisory control and data acquisition system associated with the at least one wind turbine.

4. The method of claim 1, wherein the at least one future state is predicted based on a maximum Lyapunov exponent.

5. The method of claim 1, wherein the at least one wind turbine comprises a wind farm including a plurality of wind turbines.

6. The method of claim 1, further comprising detecting a change in the current operating environment of the at least one wind turbine by comparing a best fitness of a current generation of the population with a best fitness of a previous generation of the population.

7. A control system, comprising:
   an electronic processor configured to:
      embed time series data relating to at least one wind turbine within a reconstructed phase space to provide embedded data;
      predict at least one future state related to the at least one wind turbine based on a rate of separation of trajectories of the embedded data within the reconstructed phase space;
      control operation of the at least one wind turbine based on the at
   least one future state,
      Wherein the processor is configured to
         generate a population comprising a plurality of individuals, each individual comprising a dominant genotype and a recessive genotype, wherein each genotype represents a solution for controlling the at least one wind turbine;
         evaluate a fitness of the solutions for controlling the at least one wind turbine associated with the plurality of individuals for a current operating environment of the at least one wind turbine by applying a fitness function to the dominant genotype of each individual, wherein the fitness function is based on the at least one future state;
         store previously encountered genotypes in a recessive genotype of the individuals; and
         select a solution of the solutions for controlling operation of the at least one wind turbine based on the fitness evaluation.

8. The control system of claim 7, wherein the processor is configured to detect a change in the current operating environment of the at least one wind turbine by comparing a best fitness of a current generation of the population with a best fitness of a previous generation of the population.

9. The control system of claim 7, wherein the at least one future state comprises at least one of a wind state, a wind turbine system load state, and a power demand state.

10. The control system of claim 7, wherein the time series data is collected from a supervisory control and data acquisition system associated with the at least one wind turbine.

11. The control system of claim 7, wherein the processor is configured to embed the time series data within the reconstructed phase space by calculating a minimum embedding dimension using a False Nearest Neighbors process.

12. The control system of claim 7, wherein the at least one future state of the system is predicted based on a maximum Lyapunov exponent.

13. The control system of claim 7, wherein the at least one wind turbine comprises a wind farm including a plurality of wind turbines.

14. A non-transitory computer-readable medium having instructions stored thereon, the instructions being executable by a processor to execute a method, the method comprising:
   embedding data related to operation of at least one wind turbine in a reconstructed phase space to provide embedded data;

predicting at least one future state of the at least one wind turbine based on a rate of separation of trajectories of the embedded data within the reconstructed phase space;

generating a population comprising a plurality of individuals, each individual comprising a dominant genotype and a recessive genotype, wherein each genotype represents a solution for controlling the at least one wind turbine;

evaluating a fitness of the solutions for controlling the at least one wind turbine associated with the plurality of individuals for a current operating environment of the at least one wind turbine by applying a fitness function to the dominant genotype of each individual, wherein the fitness function is based on the at least one future state;

storing previously encountered genotypes in the recessive genotypes of the individuals; and selecting a solution of the solutions for controlling the at least one wind turbine based evaluating the fitness of the solutions.

15. The non-transitory computer-readable medium of claim 14, wherein the method further comprises detecting a change in the current operating environment of the at least one wind turbine by comparing a best fitness of a current generation of the population with a best fitness of a previous generation of the population.

16. The non-transitory computer-readable medium of claim 14, wherein the data comprises data relating to at least one of a wind state, a wind turbine system load state, and a power demand state.

17. The non-transitory computer-readable medium of claim 14, wherein the at least one future state of the system is predicted based on a maximum Lyapunov exponent.

18. The non-transitory computer-readable medium of claim 14, wherein the at least one wind turbine comprises a wind farm including a plurality of wind turbines.

* * * * *